US007358466B1

(12) United States Patent
Myers et al.

(10) Patent No.: US 7,358,466 B1
(45) Date of Patent: Apr. 15, 2008

(54) LOCALIZED HEAT TREATING APPARATUS FOR BLISK AIRFOILS

(75) Inventors: Jeffrey L. Myers, Madison Township, OH (US); Thomas F. Broderick, Springboro, OH (US)

(73) Assignee: General Electric Company, Schenectady, NY (US)

( * ) Notice: Subject to any disclaimer, the term of this patent is extended or adjusted under 35 U.S.C. 154(b) by 296 days.

(21) Appl. No.: 11/330,635

(22) Filed: Jan. 12, 2006

(51) Int. Cl.
*H05B 3/44* (2006.01)
*B64C 1/00* (2006.01)

(52) U.S. Cl. ...................... 219/544; 219/202; 219/203; 219/201; 219/535; 219/548; 219/553; 244/133; 244/134 E; 244/134 D; 244/134 R

(58) Field of Classification Search ................ 219/544, 219/201-3, 535, 548, 553; 244/133, 134 E, 244/134 D, 134 R
See application file for complete search history.

(56) References Cited

U.S. PATENT DOCUMENTS

| | | | |
|---|---|---|---|
| 4,179,316 | A | 12/1979 | Connors et al. |
| 4,486,240 | A | 12/1984 | Sciaky |
| 4,731,131 | A | 3/1988 | Sakata et al. |
| 4,743,733 | A | 5/1988 | Mehta et al. |
| 5,038,014 | A | 8/1991 | Pratt et al. |
| 5,762,727 | A | 6/1998 | Crawmer et al. |
| 5,904,201 | A | 5/1999 | Jackson et al. |
| 6,110,302 | A | 8/2000 | Gorman |
| 6,160,237 | A | 12/2000 | Schneefeld et al. |
| 6,274,193 | B1 | 8/2001 | Rigney et al. |
| 6,524,072 | B1 | 2/2003 | Brownell et al. |
| 6,568,077 | B1 | 5/2003 | Hellemann et al. |
| 6,609,894 | B2 | 8/2003 | Jackson et al. |
| 6,659,332 | B2 | 12/2003 | Smashey et al. |
| 6,884,975 | B2 | 4/2005 | Matsen et al. |
| 2002/0148115 | A1 | 10/2002 | Burke et al. |
| 2003/0000602 | A1 | 1/2003 | Smith et al. |
| 2005/0029235 | A1 | 2/2005 | Mielke |
| 2005/0084381 | A1 | 4/2005 | Groh et al. |

FOREIGN PATENT DOCUMENTS

| | | |
|---|---|---|
| EP | 0 038 993 | 11/1981 |
| EP | 1 153 699 A2 | 11/2001 |
| EP | 1 227 170 A2 | 7/2002 |
| EP | 1 486 286 A2 | 12/2004 |
| JP | 55008462 | 1/1980 |

*Primary Examiner*—Shawntina Fuqua
(74) *Attorney, Agent, or Firm*—McNees Wallace & Nurick LLC

(57) ABSTRACT

The present invention is a BLISK airfoil heat treating apparatus and method for heat treating the leading and/or trailing edge section(s) of a BLISK airfoil using the BLISK airfoil heat treating apparatus. The apparatus comprises a pair of hingedly connected heat treating shells, each shell having a cavity for receiving an airfoil edge section requiring heat treatment. A resistive heating element is positioned with the shells to heat the cavities.

20 Claims, 5 Drawing Sheets

LOCALIZED HEAT TREATING APPARATUS FOR BLISK AIRFOILS

FIELD OF THE INVENTION

This invention relates to an apparatus for heat treating a BLISK in which an airfoil has been repaired by welding and, more particularly, to an apparatus that can be used to heat treat only the weld-repaired area.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gas is passed through a turbine mounted on the same shaft. The flow of gas turns the turbine by contacting an airfoil portion of the turbine blade, which turns the shaft and provides power to the compressor. The hot exhaust gases flow from the back of the engine, driving it and the aircraft forward. There may additionally be a bypass fan that forces air around the center core of the engine, driven by a shaft extending from the turbine section.

The compressor, the turbine, and the bypass fan have a similar construction. They each have a rotor assembly included in a rotor disk and a set of blades extending radially outwardly from the rotor disk. The compressor, the turbine, and the bypass fan share this basic configuration. However, the materials of construction of the rotor disks and the blades, as well as the shapes and sizes of the rotor disks and the blades, vary in these different sections of the gas turbine engine. The blades may be integral with and metallurgically bonded to the disk, forming a BLISK ("bladed disk", also sometimes known as an "integrally bonded rotor" or IBR), or they may be mechanically attached to the disk.

During manufacture or service, one (or more) of the blades of the BLISK may be damaged, as for example, by the impact of particles entrained in the gas flow that impinges on the blade. If the damage is nicks, dents, or local loss of material, the blade must be repaired. In the repair, the damaged area has new material deposited onto it. The BLISK is then heat treated to relieve residual stresses. However, the heat treatment exposure of the entire BLISK can reduce the properties of the other areas of the BLISK and is not desirable.

What is needed is a heat-treatment apparatus that can be used to heat treat a portion of a weld-repaired BLISK airfoil without exposing the entire BLISK to the heat treatment. The present invention fulfills this need, and further provides related advantages.

SUMMARY OF THE INVENTION

An embodiment of the present invention is an apparatus for heat treating an edge section of an airfoil of a bladed disk. The apparatus comprises a pair of heat treating bodies, a first heat treating body being hingedly connected to a second heat treating body. Each body comprises a first airfoil-receiving end section having a first end and a second opposite end section having a second end. Each airfoil-receiving section comprises a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch section and the slot section being configured to receive an airfoil edge. Each body having a substantially planar path of hinged rotation, the at least substantially planar path of hinged rotation of the first body being at a preselected angle with respect to the at least substantially planar path of hinged rotation of the second body. Each body further comprises a resistive heating element being disposed within at least one of the airfoil receiving cavities.

Another embodiment of the present invention is an apparatus for heat treating an edge section of an airfoil of a bladed disk comprising a heat treating body comprising a first airfoil-receiving end section having a first end and a second opposite end section having a second end. The airfoil-receiving section comprises a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch being configured to receive an airfoil edge. A resistive heating element is disposed within the airfoil receiving cavity.

Another embodiment of the present invention is a method for post-weld heat treating comprising providing a bladed disk, the bladed disk comprising a disk section and a plurality of airfoil sections attached to the disk section, each airfoil section comprising a leading airfoil edge section comprising a leading airfoil edge, a main section, and a trailing airfoil edge section comprising a trailing airfoil edge, at least one of the airfoil edge sections requiring a localized heat treatment. The method further comprises providing an apparatus for heat treating an edge portion of an airfoil of a bladed disk. The heat treating apparatus comprises a pair of heat treating bodies, a first heat treating body being hingedly connected to a second heat treating body. Each body comprises a first airfoil edge receiving end section having a first end and a second opposite end section having a second end. Each the airfoil-receiving end section comprising a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch being configured to receive an airfoil edge. Each body has a substantially planar path of hinged rotation, the at least substantially planar path of hinged rotation of the first body being at a preselected angle with respect to the at least substantially planar path of hinged rotation of the second body. At least one resistive heating element is disposed within at least one of the airfoil receiving cavities, the heating element being connected to a source of controlled electrical power. The next step is attaching the heat treating apparatus to the at least one airfoil edge section requiring heat treatment, such that the at least one airfoil edge section requiring heat treatment is positioned within the airfoil-receiving end section such that the notch section, the slot section, and the cavity provide a preselected positioning of the at least one airfoil edge section requiring heat treatment within the cavity such that the at least one resistive heating element is capable of providing an appropriate amount of heat to heat treat the at least one airfoil edge section requiring heat treatment. The next step is powering the at least one resistive heating element with a preselected amount of electrical current at a preselected voltage potential to heat the at least one cavity to a preselected temperature in an environment selected from the group consisting of air, a protective atmosphere and a vacuum. The next step is holding the at least one cavity at a preselected temperature for a preselected period of time to heat treat the at least one airfoil edge section requiring heat treatment to heat treat the at least one airfoil edge section. The next step is cooling the at least one airfoil edge section.

Another embodiment of the present invention is another method for post-weld heat treating comprising providing a bladed disk, the bladed disk comprising a disk section and a plurality of airfoil sections attached to the disk section, each airfoil section comprising a leading airfoil edge section comprising a leading airfoil edge, a main section, and a trailing airfoil edge section comprising a trailing airfoil edge, one of the airfoil edge sections requiring a localized heat treatment. The method further comprises providing an apparatus for heat treating an edge portion of an airfoil of a bladed disk. The heat treating apparatus comprises a heat treating body comprising a first airfoil edge receiving end section having a first end and a second opposite end section having a second end. The airfoil-receiving end section comprises a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch being configured to receive an airfoil edge. A resistive heating element is disposed within the airfoil receiving cavity, the heating element being connected to a source of controlled electrical power. The next step is attaching the heat treating apparatus to the airfoil edge section requiring heat treatment, such that the at least one airfoil edge section requiring heat treatment is positioned within the airfoil-receiving end section such that the notch section, the slot section, and the cavity provide a preselected positioning of the at least one airfoil edge section requiring heat treatment within the cavity such that the resistive heating element is capable of providing an appropriate amount of heat to heat treat the airfoil edge section requiring heat treatment. The next step is powering the resistive heating element with a preselected amount of electrical current at a preselected voltage potential to heat the cavity to a preselected temperature in an environment selected from the group consisting of air, a protective atmosphere and a vacuum. The next step is holding the cavity at a preselected temperature for a preselected period of time to heat treat the airfoil edge section requiring heat treatment to heat treat the airfoil edge section. The next step is cooling the airfoil edge section.

An advantage of the present invention is that only an airfoil edge portion of a BLISK airfoil is subjected to the heat treatment of the present invention, without exposing the entire BLISK to the heat treatment.

Another advantage of the present invention is that the entire BLISK does not need to be heated, reducing the amount of energy required to treat the BLISK.

Another advantage of the present element is that the heat-up times for the heat treatment is reduced, increasing the speed with which the BLISK airfoils can be heat treated.

Other features and advantages of the present invention will be apparent from the following more detailed description of the preferred embodiment, taken in conjunction with the accompanying lower cost and improved performance drawings which illustrate, by way of example, the principles of the invention.

DETAILED DESCRIPTION OF THE INVENTION

Figure 1:
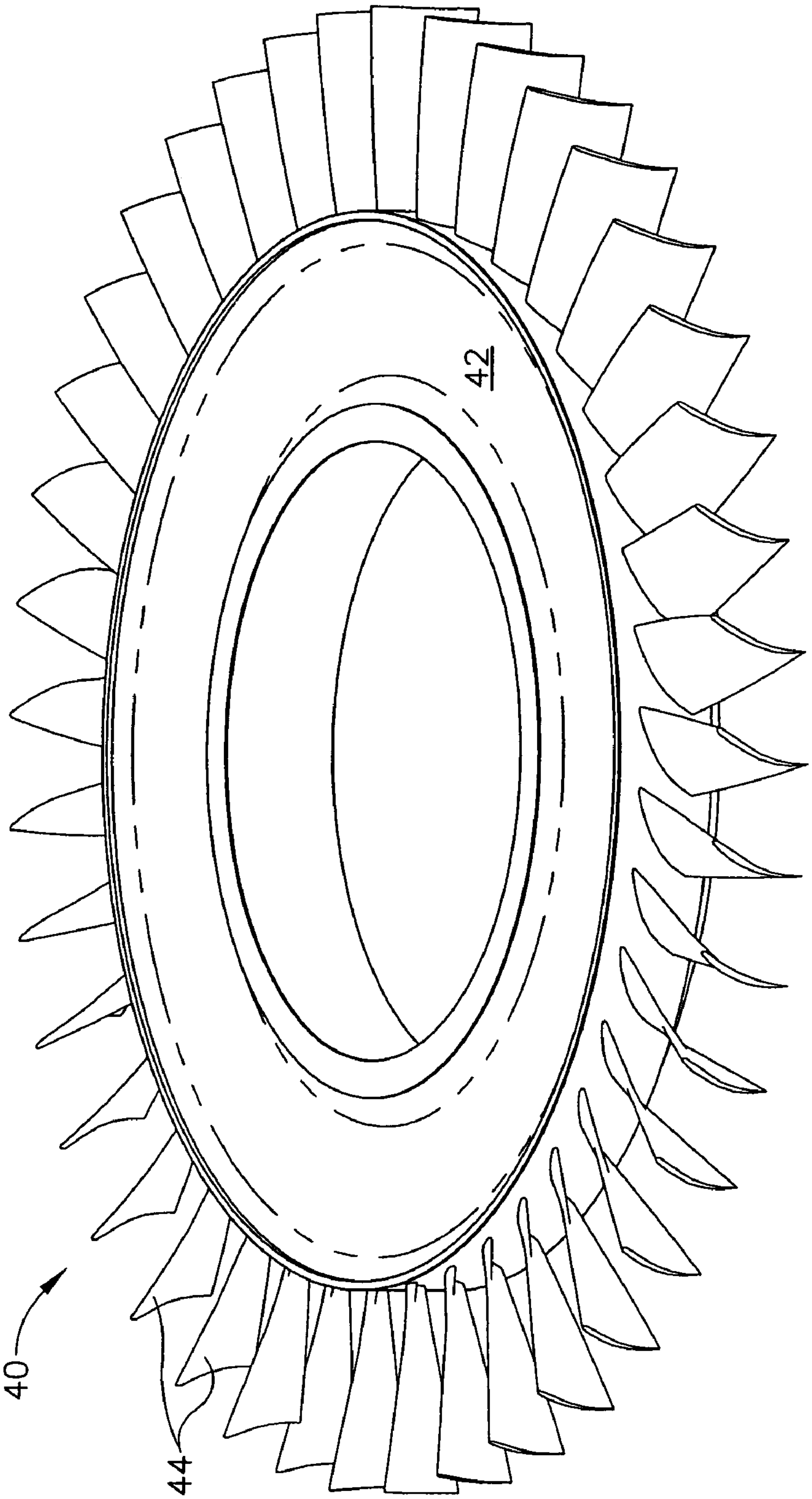
FIG. 1 is a perspective view of a BLISK.

The present invention is a BLISK airfoil heat treating apparatus and method for heat treating the leading and/or trailing edge section(s) of a BLISK airfoil. "BLISK" is a term of art that is a contraction of the term "bladed disk", which is also sometimes called an integrally bladed rotor or IBR. As shown in FIG. 1, an exemplary BLISK 40 comprises a central disk thick section 42 and a plurality of compressor or turbine blades 44 that are prepared integrally with or metallurgically bonded to the thick section 42. The BLISK 40 may be made of any operable material, such as, for example, a nickel-based, cobalt-based, and/or iron-based superalloy.

Figure 2:
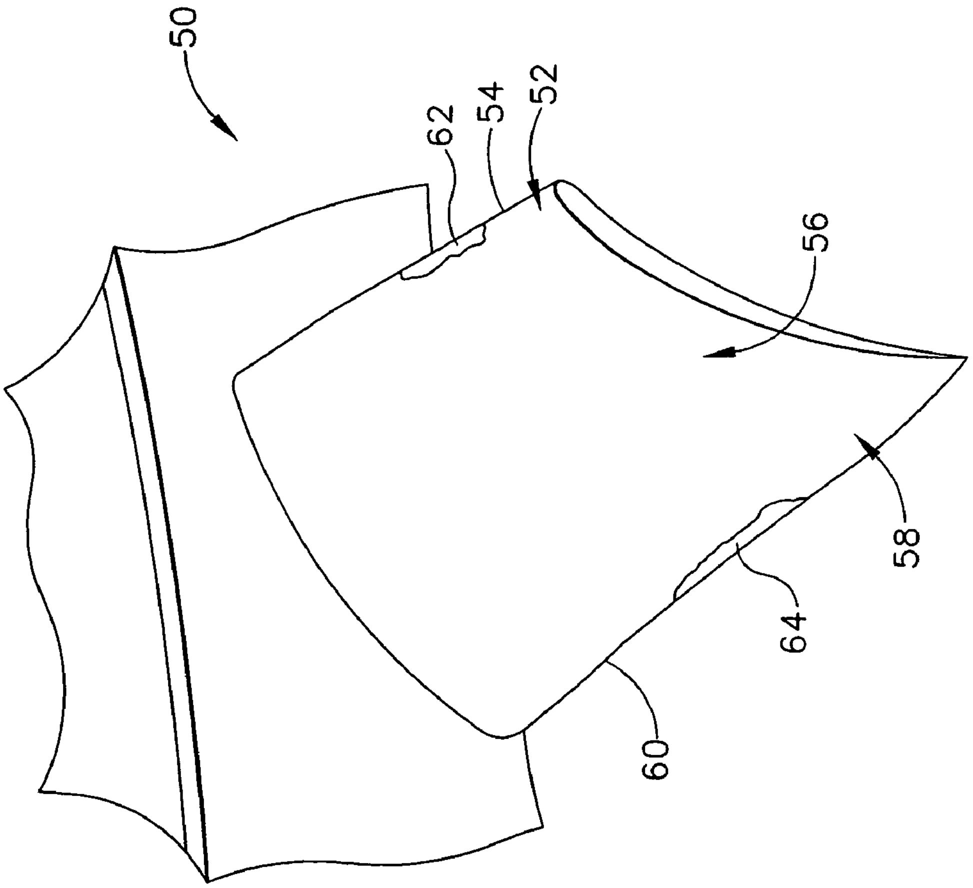
FIG. 2 is a detail of a repaired airfoil of a BLISK requiring heat treatment.

An exemplary BLISK airfoil 50 requiring post-repair heat treatment is shown in FIG. 2 comprising a leading edge section 52, including a leading edge 54, a main body section 56, and a trailing edge section 58, including a trailing edge 60. In the BLISK in FIG. 2, two regions of the airfoil 50, the leading edge section 52, and the trailing edge section 58, have been repaired, with a first metallic repair material 62 shown on the leading edge section 52 and a second metallic repair material 64 shown on the trailing edge section 58. During the exemplary repair process, repair metal 62, 64 is deposited onto the leading edge section 52 and the trailing edge section 58 to repair the leading edge section 52 and the trailing edge section 58. The deposition is accomplished by any operable approach, but is typically accomplished by welding or by a thermal spray process. The repair metal 62, 64 may be of the same chemical composition as the damaged blades, or a different composition.

Once the metal repair material 62, 64 is deposited, the airfoil 50 requires heat treatment to relieve residual stresses. However, conducting the heat treatment on the entire BLISK would degrade the properties in the thick sections of the non-repaired portions of the BLISK, such as the thick section 42 of the BLISK.

Figure 3:
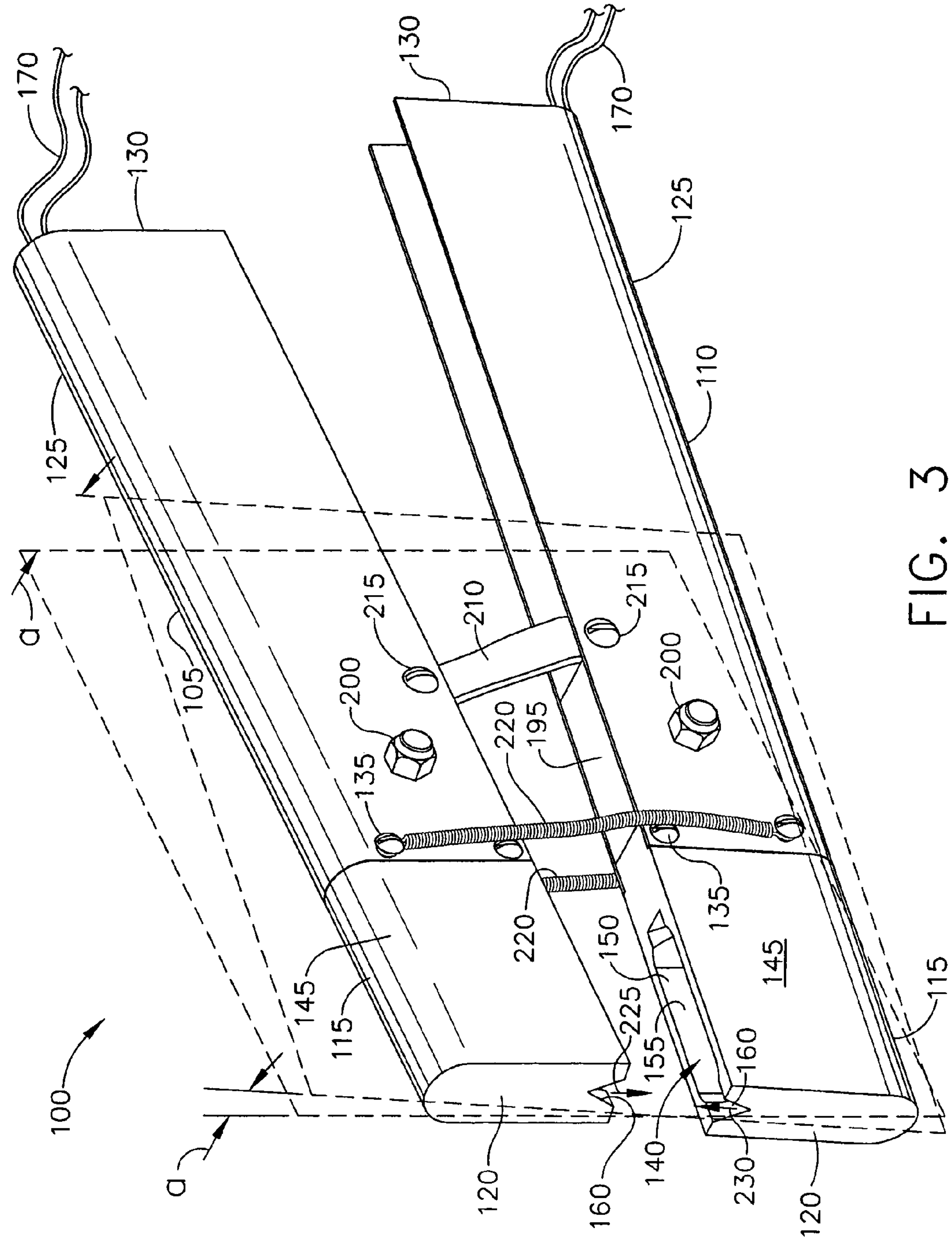
FIG. 3 is a perspective view of one embodiment of a BLISK heat treat apparatus of the present invention.
Figure 4:
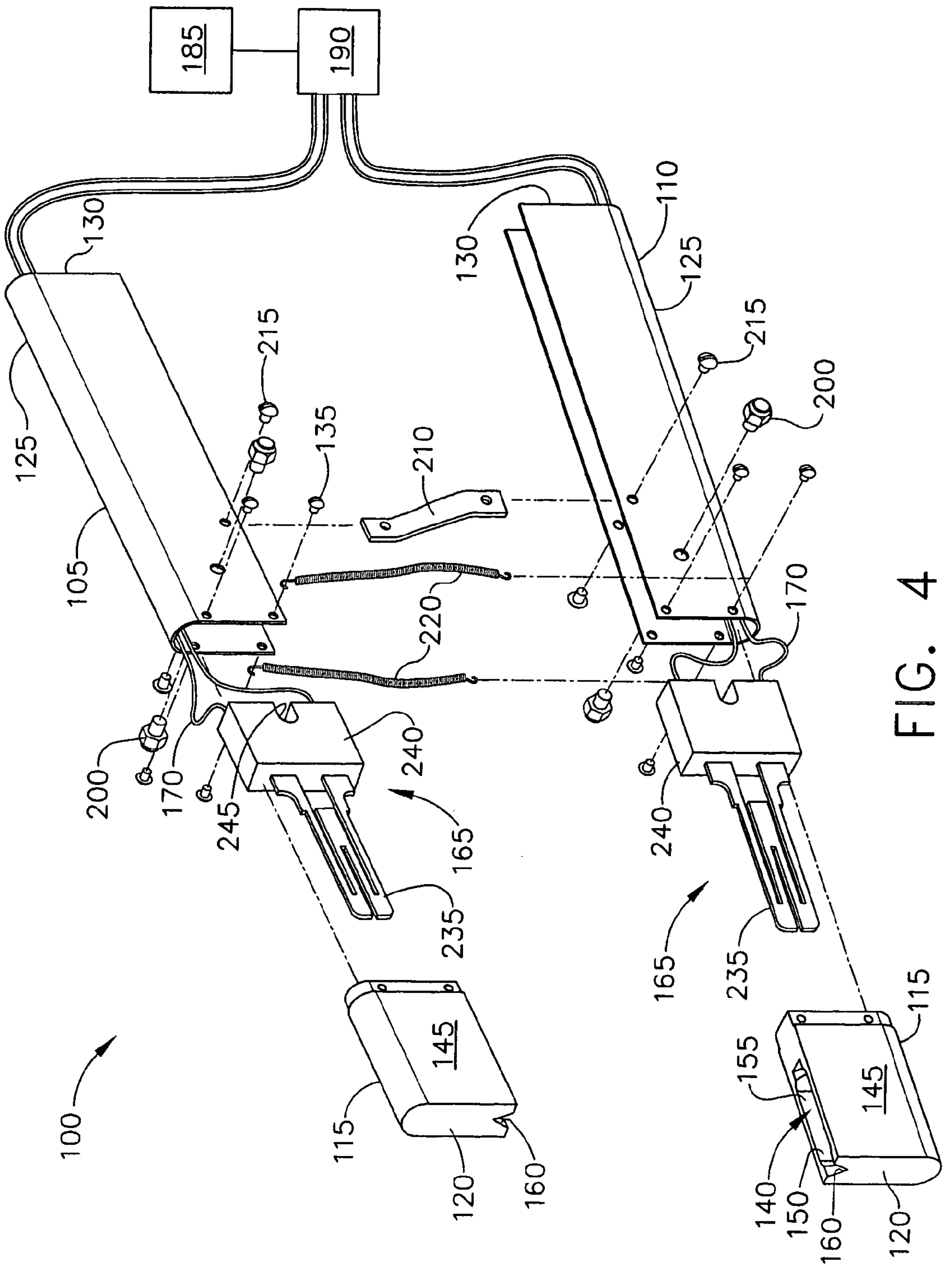
FIG. 4 is an exploded perspective view of one embodiment of a BLISK heat treat apparatus of the present invention.
Figure 5:
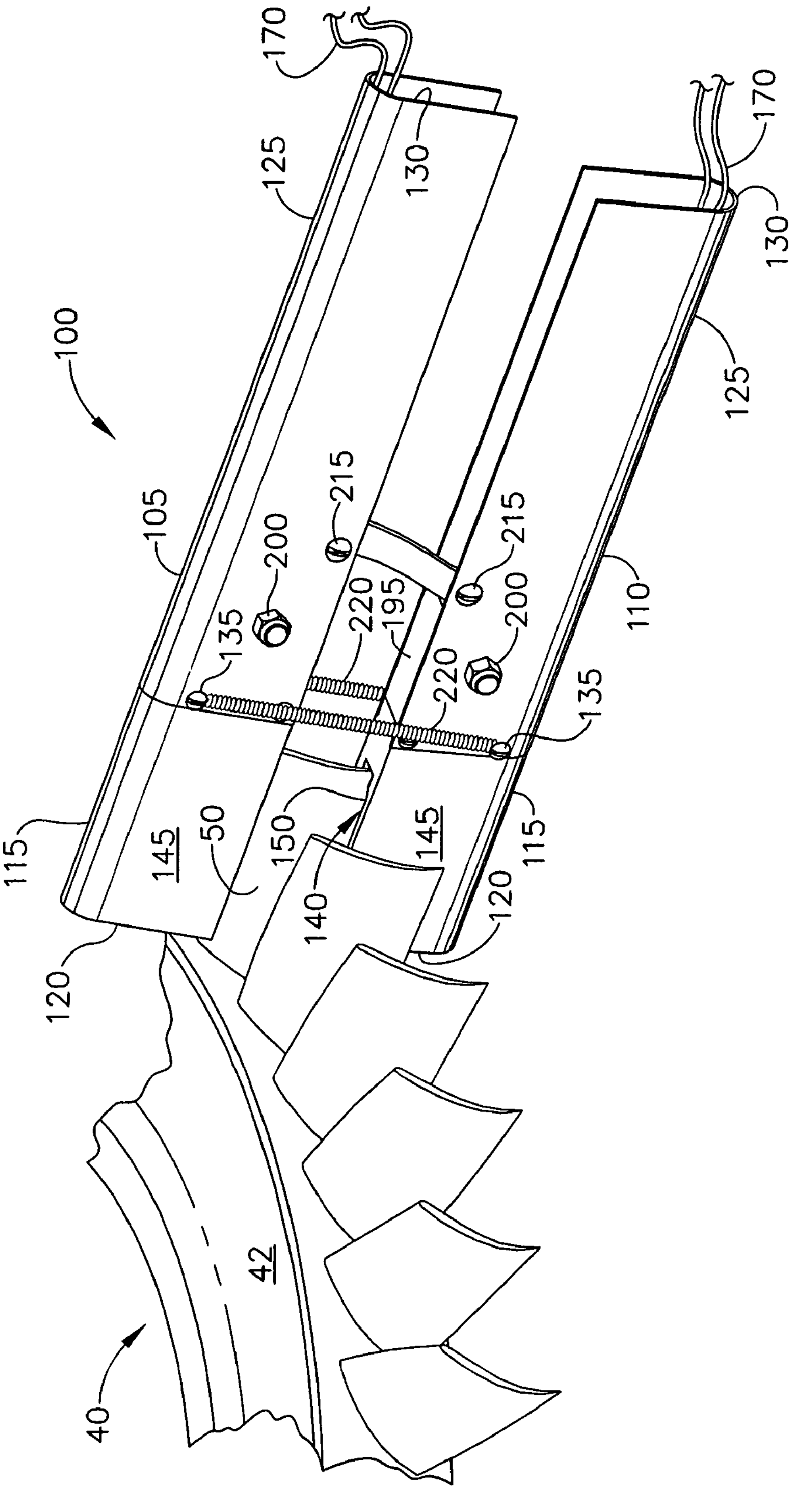
FIG. 5 is a perspective view of one embodiment of the BLISK heat treat apparatus mounted on a weld repaired airfoil of a BLISK undergoing repair.

As shown in FIGS. 3-5, the BLISK heat treating apparatus 100 of the present invention permits the heat treatment of the leading edge section 52 and/or the trailing edge section 58 of the BLISK airfoil 50 by limiting the action of the heat treatment to just the leading edge section 52 and/or the trailing edge section 58. The BLISK heat treating apparatus 100 is shown in a perspective view in FIG. 3 and the components of the BLISK heat treating apparatus 100 are shown in an exploded view in FIG. 4. FIG. 5 illustrates that apparatus 100 attached to the BLISK airfoil 50.

The BLISK heat treating apparatus 100 comprises a pair of heat treating shells, shown as a first heat treating shell 105 and a second heat treating shell 110. Each shell comprises a first airfoil receiving end section 115 comprising a first end 120 and a second opposite end section 125 comprising a second end 130. Each first end section 115 and second end section 125 may be unitary with one another or, as shown in FIGS. 3-5, they may be separate elements comprising two different types of metals. The first end sections 115 are attached to the second end sections, either mechanically or by a weld. In the embodiment shown in FIGS. 3-5, the first end sections 115 are attached to the second end sections 125 by section attachment screws 135. The sections 115, 125 may also be welded together.

In a preferred embodiment, the first sections 115 comprise the well-known nickel-base superalloy INCONEL® 718. INCONEL® 718 is a designation for an alloy comprising about 19 weight percent iron, about 18 weight percent chromium, about 5 weight percent tantalum and niobium, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper, and balance nickel. INCONEL® is a federally registered trademark owned by Huntington Alloys Corporation of Huntington, W. Va. The composition of the metal comprising the first section 115 must be sufficient to withstand temperatures in the range of about 70° F. to about 1800° F. without melting or undergoing deformation. In a preferred embodiment, the second sections 125 comprise stainless steel. In the embodiment shown in FIGS. 3-5, the second sections 125 comprise a sheet of stainless steel formed into a U-shape.

Each first end section 115 further comprises a cavity 140 for receiving a gas turbine engine BLISK airfoil edge section. Each cavity 140 is defined by a metal body 145 of the first end sections 115 and by an airfoil edge section receiving aperture 150. Each aperture 150 comprises a slot section 155 and a notch section 160. The notch section 160 is configured to receive an airfoil edge.

A resistive heating element 165 is positioned in at least one of the cavities 140 of at least one of the shells 105, 110 to enable the heating element 165 to heat at least one of the cavities 140 to a preselected temperature in the range of about 70° F. to about 1800° F., with two heating elements 165 being shown in FIGS. 3-5. As shown in FIGS. 3-5, each heating element 165 comprises a resistive heating element 235, comprising, for example, silicon carbide, and a holder 240 comprising a refractory material, such as, for example, but not limited to, steatite, cordierite, or alumina. The resistive heating element 235 is disposed in the ceramic holder 240 as known in the art, for example, but not so limited, by using a ceramic adhesive material. During operation, electrical current is passed through the resistive heating element 235 by a voltage potential, causing the material to heat up and radiate heat. Electrical wiring 170 connects the heating elements 165 to a control system 190, as known in the art, to enable control of the heating elements 165 and to a controlled electrical power source 185. The ceramic holder 240 also provides electrical insulation at the point where the electrical wiring 170 connects to the resistive heating element 235. As shown in FIGS. 3-5, a heating element 165 is positioned in both of the shells 105, 110 to enable the heating of both cavities 140 and is mechanically attached to the shells 105, 110. As shown in FIGS. 3-5, the heating elements 165 are attached to the shells 105, 110 by a structural support bolt 200. In the embodiment shown in FIGS. 3-5, the heating element is a CHRYSTAR® recrystallized silicon carbide igniter, Model No. 271, commercially available from Saint-Gobain Ceramics & Plastics, Inc. of Louisville, Ky. CHRYSTAR® is a federally registered trademark that is listed in the Trademark Electronic Search System as being owned by Norton Company of Worcester, Mass.

A pivot bar 210 is attached to each shell 105, 110 to hingedly connect the shells 105, 110 to each other. The pivot bar 210 is configured and attached to the shells 105, 110 in such a manner so as to enable the first shell 105 to have a first at least substantially planar path of hinged rotation 225 and to enable the second shell 110 to have a second at least substantially planar path of hinged rotation 230, where the first at least substantially planar path of hinged rotation 225 is at a preselected angle α with respect to the second at least substantially planar path of hinged rotation 230. The angle α is preferably in the range of about 5° to about 30° and its selection depends upon the geometry of the airfoil 50. For example, in the embodiment shown in 3-5, the angle α is about 5° because of the geometry of the airfoil 50. In the embodiment shown in FIGS. 3-5, the pivot bar 210 is joggled and attached to the shells 105, 110 by hinge attachment screws 215.

Optionally, a spring 220 or set of springs 220 may be attached to the shells 105, 110 to hold the apparatus 100 in position against the blade 50 during heat treatment, as shown in FIG. 5. As shown in FIGS. 3-5 a pair of tension springs 220 are attached to the shells 105, 110 by the section attachment screws 135 so as to position the tension springs 220 between the hinge attachment screws 215 and the first end 120. Optionally, if a compression spring (or springs) were used instead, such a compression spring would need to be placed between the hinge attachment screws 215 and the second end 130.

The present invention also includes a method of heat treating an edge section 52, 58 of an airfoil 50 of a BLISK 40. The method comprises providing a bladed disk 40, the bladed disk 40 comprising a disk section 42 and a plurality of airfoil sections 50 attached to the disk section 42, each airfoil section 50 comprising a leading airfoil edge section 52 comprising a leading airfoil edge 54, a main section 56, and a trailing airfoil edge section 58 comprising a trailing airfoil edge 60, at least one of the airfoil edge sections 52, 58 requiring a localized heat treatment. The method further comprises providing an apparatus 100 for heat treating an edge section 52, 58 of an airfoil 50 of a bladed disk 40, the heat treating apparatus 100 comprising a pair of heat treating bodies, a first heat treating body 105 being hingedly connected to a second heat treating body 110, each body 105, 110 comprising a first airfoil edge receiving end section 115 comprising a first end 120 and a second opposite end section 125 having a second end 130. Each airfoil-receiving end section 115 comprises a cavity 140 for receiving a gas turbine engine bladed disk airfoil edge section 52, 58. Each cavity 140 is defined by a metal body 105, 110 and an airfoil edge section receiving aperture 150. Each aperture 150 comprises a slot section 155 and a notch section 160, the notch section 160 being positioned at the first end 120, the notch section 160 being configured to receive an airfoil edge 54, 60. Each body 105, 110 has a substantially planar path of hinged rotation, the first at least substantially planar path of hinged rotation 225 of the first body 105 being at a preselected angle α with respect to the second at least substantially planar path of hinged rotation 230 of the second body 110. A resistive heating element 165 is disposed within at least one of the airfoil receiving cavities 140, the heating element 165 being connected to a source of controlled electrical power 185. The next step is attaching the heat treating apparatus 100 to the at least one airfoil edge section requiring heat treatment 54, 60, such that the notch section 160, the slot section 155, and the cavity 140 provide a preselected positioning of the at least one airfoil edge section 52, 58 within the cavity 140 such that the at least one resistive heating element 165 is capable of providing an appropriate amount of heat to heat treat the at least one airfoil edge section 52, 58 requiring heat treatment. The next step is powering the resistive heating element 165 with a preselected amount of electrical current at a preselected voltage potential to heat the cavity 140 to a preselected temperature in an environment selected from the group consisting of air, a protective atmosphere and a vacuum. Such a temperature is in the range of about 70° F. to about 1600° F. The next step is holding the cavity 140 at a preselected temperature for a preselected period of time to heat treat the airfoil edge section requiring heat treatment 52, 58 to heat treat the airfoil edge section 52, 58. Such a time will generally be in the range of about 10 minutes to about 480 minutes. The next step is cooling the airfoil edge section. Either one or both cavities may be heated as set forth in the embodiment of the method as set forth herein. A single heat treating shell 105 may be used for another embodiment of the method of the present invention, where only one airfoil edge section 52, 58 is heat treated.

The apparatus 100 of the present invention is small enough that it can be used in a glove box or furnace, as known in the art, where the atmosphere is easily controlled. The heat treatment of the present approach may be conducted multiple times, on the same damaged blades or different damaged blades, and still allow repaired airfoils and the thick portion of the disk near the center bore to have acceptable properties. Multiple apparatuses 100 may be used to heat treat multiple airfoils at the same time. In addition, a single heat treating shell 105 may be used, without the need for a pivot bar 210.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for heat treating an edge section of an airfoil of a bladed disk comprising:
- a pair of heat treating bodies, a first heat treating body being hingedly connected to a second heat treating body, each body comprising:
  - a first airfoil-receiving end section having a first end and a second opposite end section having a second end;
  - the airfoil-receiving section comprising a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch section and the slot section being configured to receive an airfoil edge;
  - each body having a substantially planar path of hinged rotation, the at least substantially planar path of hinged rotation of the first body being at a preselected angle with respect to the at least substantially planar path of hinged rotation of the second body;
- a resistive heating element being disposed within at least one of the airfoil receiving cavities.

2. The apparatus of claim 1, wherein the preselected angle is in the range of about 5° to about 30°.

3. The apparatus of claim 2, wherein the preselected angle is about 5°.

4. The apparatus of claim 1, wherein the resistive heating element comprises a resistance element disposed within a ceramic holder.

5. The apparatus of claim 4, wherein the resistance element comprises silicon carbide.

6. The apparatus of claim 1, wherein the resistive heating element is capable of heating the cavity to a temperature in the range of about 70° F. to about 1800° F.

7. The apparatus of claim 1, wherein the resistive heating element is capable of heating the cavity to a temperature in the range of about 1000° F. to about 1600° F.

8. The apparatus of claim 4, wherein the ceramic holder comprises a material selected from the group consisting of steatite, cordierite, and alumina.

9. The apparatus of claim 8, wherein the resistance element comprises recrystallized silicon carbide.

10. An apparatus for heat treating an edge section of an airfoil of a bladed disk comprising:
- a heat treating body comprising:
  - a first airfoil-receiving end section having a first end and a second opposite end section having a second end;
  - the airfoil-receiving section comprising a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch being configured to receive an airfoil edge; and
- a resistive heating element being disposed within the airfoil receiving cavity.

11. The apparatus of claim 10, wherein the resistive heating element comprises a resistance element disposed within a ceramic holder.

12. The apparatus of claim 11, wherein the resistance element comprises silicon carbide.

13. The apparatus of claim 10, wherein the resistive heating element is capable of heating the cavity to a temperature in the range of about 70° F. to about 1800° F.

14. The apparatus of claim 10, wherein the resistive heating element is capable of heating the cavity to a temperature in the range of about 1000° F. to about 1600° F.

15. The apparatus of claim 11, wherein the ceramic holder comprises a material selected from the group consisting of steatite, cordierite, or alumina.

16. A method for post-weld heat treating comprising the steps of:
- providing a bladed disk, the bladed disk comprising a disk section and a plurality of airfoil sections attached to the disk section, each airfoil section comprising a leading airfoil edge section comprising a leading airfoil edge, a main section, and a trailing airfoil edge section comprising a trailing airfoil edge, at least one of the airfoil edge sections requiring a localized heat treatment;
- providing an apparatus for heat treating an edge portion of an airfoil of a bladed disk, the heat treating apparatus comprising:
- a pair of heat treating bodies, a first heat treating body being hingedly connected to a second heat treating body, each body comprising:
  - a first airfoil edge receiving end section having a first end and a second opposite end section having a second end;

the airfoil-receiving end section comprising a cavity for receiving a gas turbine engine bladed disk airfoil edge section, the cavity being defined by a metal body and an airfoil edge section receiving aperture, the aperture comprising a slot section and a notch section, the notch section being positioned at the first end, the notch being configured to receive an airfoil edge;

each body having a substantially planar path of hinged rotation, the at least substantially planar path of hinged rotation of the first body being at a preselected angle with respect to the at least substantially planar path of hinged rotation of the second body;

at least one resistive heating element being disposed within at least one of the airfoil receiving cavities, the at least one heating element being connected to a source of controlled electrical power;

attaching the heat treating apparatus to the at least one airfoil edge section requiring heat treatment, such that the at least one airfoil edge section requiring heat treatment is positioned within the airfoil-receiving end section such that the notch section, the slot section, and the cavity provide a preselected positioning of the at least one airfoil edge section requiring heat treatment within the cavity such that the at least one resistive heating element is capable of providing an appropriate amount of heat to heat treat the at least one airfoil edge section requiring heat treatment;

powering the at least one resistive heating element with a preselected amount of electrical current at a preselected voltage potential to heat the at least one cavity to a preselected temperature in an environment selected from the group consisting of air, a protective atmosphere and a vacuum;

holding the at least one cavity at a preselected temperature for a preselected period of time to heat treat at least one the airfoil edge section requiring heat treatment to heat treat the at least one airfoil edge section;

cooling the at least one airfoil edge section.

17. The method of claim 16, wherein the preselected angle is in the range of about 5° to about 30°.

18. The method of claim 17, wherein the preselected temperature is in the range of about 70° F. to about 1800° F.

19. The method of claim 17, wherein the preselected period of time is in the range of about 10 minutes to about 480 minutes.

20. The method of claim 18, wherein the preselected period of time is in the range of about 10 minutes to about 480 minutes.

* * * * *